UNITED STATES PATENT OFFICE.

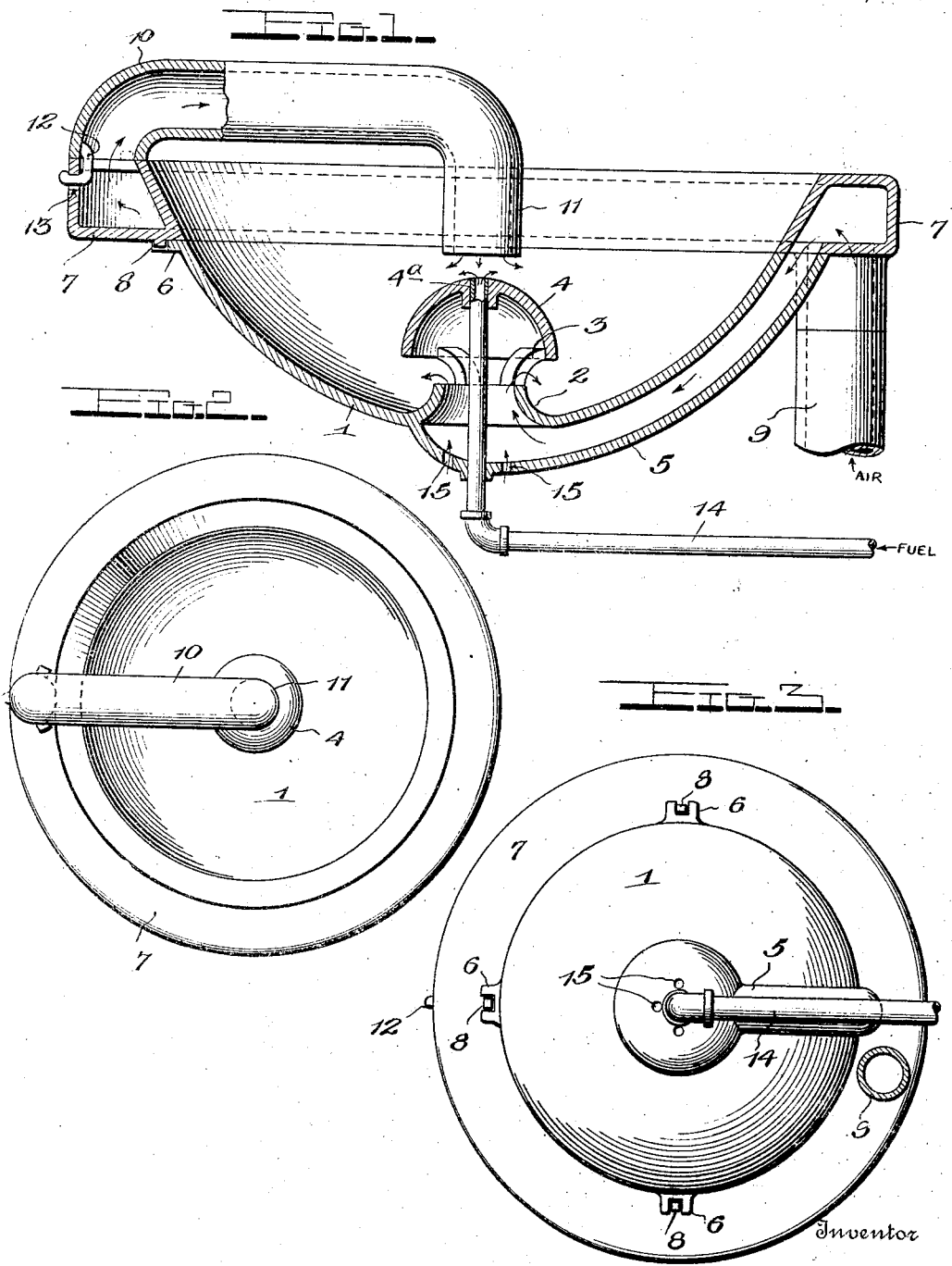

WALTER G. PRESTON, OF OMAHA, NEBRASKA.

OIL-BURNER.

1,205,389.

Specification of Letters Patent.

Patented Nov. 21, 1916.

Application filed April 14, 1916. Serial No. 91,143.

*To all whom it may concern:*

Be it known that I, WALTER G. PRESTON, a citizen of the United States, residing at Omaha, in the county of Douglas and State of Nebraska, have invented certain new and useful Improvements in Oil-Burners, of which the following is a specification.

This invention relates to oil burners and especially to that type of burner adapted to be placed within a cooking stove or heating stove or furnace, as distinguished from the usual "oil stove" or burners of the illuminating type.

Specifically the invention relates to that type of burner in which there is a downward discharge of air upon the burner.

The present invention consists in the novel features of construction hereinafter described, pointed out in the claims and shown in the accompanying drawings, in which:

Figure 1 is a vertical central section through a complete burner. Fig. 2 is a plan view of a complete burner. Fig. 3 is an inverted plan view of the burner.

As the invention resides in the construction of the burner I have not shown any portion of the stove or furnace to which it might be applied, as no two of these might be exactly alike.

In the drawings 1 represents the burner pan provided with a central opening surrounded by an upwardly extending lip 2 from which extend arms 3 supporting a burner cap 4, the arms 3 spacing the burner from the lip 2. On the underside of the pan is formed a radially extending hollow rib 5 the inner end of which is enlarged and communicates with the central opening of the pan. The pan rim is provided with outwardly extending notched lugs 6. Fitting on said pan is a hollow tube or conduit 7, the inner wall of which is arranged obliquely with reference to the vertical outer wall of the tube, whereby the inner wall forms a continuation of the sides of the pan 1, as shown in Fig. 1. The conduit 7 is provided with lugs 8, on its underside, which engage the notched lugs 6 of the pan, and prevent rotation of the conduit on the pan. The rib 5 communicates with the conduit, and an air inlet pipe 9 also leads into the conduit from below. 180° from the pipe 9 an air discharge pipe 10 leads from the top of the conduit 7 and extends inwardly over the pan and is then bent downwardly as at 11, discharging air upon the top of the burner cap 4. This pipe is locked in place by a hook 12 which engages a suitable opening 13 in the conduit. An oil supply pipe 14 enters the enlarged portion of the rib 5 and passes upwardly through the central opening of the pan and into a suitable central bore 4ª of the burner cap. Air openings 15 are also formed in the enlarged portion of the rib 5, being grouped about the pipe 14. These openings 15 also form drainage openings for escape of any overflow of oil from the pan into the rib 5. By so forming the conduit 7 that its inner wall forms an extension of the pan I enlarge the heating surface, and at the same time by causing the flame to play on the inner wall of the conduit superheat the air as it circulates through said conduit. This has two important results, it produces a more complete consumption of the oil, and by feeding highly heated air I can employ a slower draft and thereby utilize more of the heat units in the furnace.

One of the main defects in most oil burners is the forced rapid draft necessary to obtain sufficient combustion to avoid soot and smoke, and this rapid draft prevents proper preheating of the air before it comes into contact with the oil flow.

The invention might be employed without the rib 5, but it also carries a small supply of air which becomes superheated by coming in contact with undersurface of the hot pan 1, and this air, entering the pan from below, aids in converting heavy vapor at the bottom of the pan into a readily combustible vapor, thereby reducing the deposit of objectionable carbon residue to a minimum, and at the same time increasing the efficiency of the burner, aiding in maintaining the play of a hot flame on the conduit 7.

What I claim is:—

1. In a burner, a pan, a hot air conduit resting on said pan, the inner wall of the conduit forming a continuation of the pan, a burner cap mounted centrally with respect to the pan, means for feeding oil to said cap, and means for conducting superheated air from said conduit and discharging the same on said cap.

2. In a burner, a pan, an annular conduit mounted on said pan, a burner cap arranged centrally in the pan, means for feeding oil to said cap, an air inlet pipe leading to the underside of said conduit, and an air discharge pipe leading from the top of said conduit and discharging downwardly on the burner cap, said last mentioned pipe being 180° from the air inlet pipe.

3. In a device of the kind described, a pan, a burner cap arranged centrally in the pan and spaced therefrom, and a hot air conduit for feeding air to said burner cap, said conduit encircling the pan and forming a continuation upwardly of the sides of the pan.

4. In combination with a burner and pan, a conduit adapted to rest on the pan, means for preventing rotation of the conduit with respect to the pan, said conduit having an inwardly inclined inner wall adapted when the conduit is positioned on the pan to form a continuation of the walls of the pan, and means for supplying air to said conduit.

5. In a device of the kind described, a pan, a burner cap therein, an oil supply pipe to said cap, said pan having a hollow radially extending rib formed on its underside, the inner end of the rib communicating with the interior of the pan, a tube forming a hot air conduit positioned on the rim of the pan, the rib communicating at its outer end with said tube, an air supply pipe leading into said tube, and an air discharge pipe leading from the tube and on the side of the pan opposite the air supply pipe, the discharge pipe leading to the center of the pan and discharging downwardly on the burner cap.

In testimony whereof I affix my signature.

WALTER G. PRESTON.